(12) United States Patent
Braunhardt et al.

(10) Patent No.: US 11,022,022 B2
(45) Date of Patent: Jun. 1, 2021

(54) COOLING SYSTEM FOR A MOTOR VEHICLE WITH COVER DEVICES FOR INFLUENCING THE COOLING AIR SUPPLY TO COOLANT COOLERS

(71) Applicant: VOLKSWAGEN AKTIENGESELLSCHAFT, Wolfsburg (DE)

(72) Inventors: Marc Braunhardt, Edemissen (DE); Wido Stürwold, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/507,223

(22) Filed: Jul. 10, 2019

(65) Prior Publication Data

US 2020/0018221 A1    Jan. 16, 2020

(30) Foreign Application Priority Data

Jul. 10, 2018   (DE) ..................... 10 2018 211 425.0

(51) Int. Cl.
*F01P 7/02* (2006.01)
*F01P 7/12* (2006.01)
(Continued)

(52) U.S. Cl.
CPC ................ *F01P 7/12* (2013.01); *B60K 11/04* (2013.01); *B60K 11/085* (2013.01)

(58) Field of Classification Search
CPC ....... B60K 11/085; B60K 11/04; B60K 11/02; B60K 11/06; F01P 5/06; F01P 11/10;
(Continued)

(56) References Cited

U.S. PATENT DOCUMENTS 3,973,590 A * 8/1976 Logsdon ................. F16K 11/16
137/599.03
7,290,593 B2  11/2007 Kolb
(Continued)

FOREIGN PATENT DOCUMENTS

DE   10 2005 056 966 A1   5/2007
DE   10 2010 038 194 A1   4/2011
(Continued)

*Primary Examiner* — George C Jin
*Assistant Examiner* — Teuta B Holbrook
(74) *Attorney, Agent, or Firm* — Pearl Cohen Zedek Latzer Baratz LLP

(57) ABSTRACT

A cooling system for a motor vehicle, has a first cooling circuit arrangement with a first coolant cooler and a second coolant circuit arrangement with a second coolant cooler. A cooling air supply to the first coolant cooler can be varied by means of a first cover device, and a cooling air supply to the second coolant cooler can be varied by means of a second cover device. The first cover device and the second cover device can be moved by means of an interposed gear of a shared drive, whereby the gear is configured such that, when the drive is being operated for opening purposes, the second cover device is moved earlier and/or faster than the first cover device out of a closed position in the direction of an open position. This makes it possible to supply cooling air to meet an already existent cooling demand of the second coolant cooler, whereas such a cooling demand does not yet exist for the first coolant cooler, so that the latter can still remain covered—in terms of a flow of cooling air—by means of the associated (first) cover device. This can have a positive effect on the flow resistance for the cooling air and thus on the aerodynamics of the motor vehicle.

10 Claims, 7 Drawing Sheets

(51) Int. Cl.
 *B60K 11/04* (2006.01)
 *B60K 11/08* (2006.01)
(58) Field of Classification Search
 CPC . F01P 2001/005; F01P 2037/00; Y02T 10/12; B60H 1/00671; F28F 1/128
 See application file for complete search history.

(56) References Cited

U.S. PATENT DOCUMENTS

| | | | |
|---|---|---|---|
| 7,464,700 | B2 | 12/2008 | Kolb |
| 8,161,919 | B2* | 4/2012 | Klotz ................... B60K 11/085 123/41.04 |
| 8,601,986 | B2* | 12/2013 | Faulkner ................. F01P 7/165 123/41.29 |
| 8,733,484 | B1 | 5/2014 | Klop |
| 8,794,360 | B2* | 8/2014 | Nemoto ............... B60K 11/085 180/68.1 |
| 9,670,824 | B2* | 6/2017 | Sowards .................... F01P 7/12 |
| 9,751,394 | B1 | 9/2017 | Speichinger et al. |
| 9,827,847 | B1 | 11/2017 | Hanna et al. |
| 2010/0243352 | A1* | 9/2010 | Watanabe ............. B60K 11/085 180/68.1 |
| 2010/0282533 | A1 | 11/2010 | Sugiyama |
| 2011/0097984 | A1 | 4/2011 | Hasegawa et al. |
| 2011/0251761 | A1 | 10/2011 | Charnesky et al. |
| 2011/0281515 | A1 | 11/2011 | Lockwood et al. |
| 2012/0060776 | A1* | 3/2012 | Charnesky ........... B60K 11/085 123/41.05 |
| 2012/0305818 | A1 | 12/2012 | Charnesky et al. |
| 2013/0092462 | A1* | 4/2013 | Chinta ................. B60K 11/085 180/68.1 |
| 2013/0149119 | A1 | 6/2013 | Seo |
| 2013/0275009 | A1* | 10/2013 | Sakai .................... B60K 11/085 701/49 |
| 2014/0196965 | A1* | 7/2014 | Platto ................... B60K 11/085 180/68.1 |
| 2015/0197148 | A1* | 7/2015 | Kobayashi ........... B60K 11/085 701/49 |
| 2017/0045255 | A1* | 2/2017 | Karamanos ............... F24F 11/79 |
| 2018/0022210 | A1* | 1/2018 | Matsumura ........ B60H 1/00771 123/41.05 |

FOREIGN PATENT DOCUMENTS

| | | |
|---|---|---|
| DE | 10 2011 101 272 A1 | 11/2011 |
| DE | 10 2011 015 993 A1 | 1/2012 |
| DE | 10 2012 209 074 A1 | 12/2012 |
| DE | 10 2014 016 483 A1 | 5/2016 |
| DE | 10 2015 109 229 A1 | 12/2016 |
| DE | 10 2017 005 336 A1 | 12/2017 |
| JP | 2008-106982 A | 5/2008 |
| WO | WO 2008/002264 A1 | 1/2008 |
| WO | WO 2009/087106 A1 | 7/2009 |

* cited by examiner

COOLING SYSTEM FOR A MOTOR VEHICLE WITH COVER DEVICES FOR INFLUENCING THE COOLING AIR SUPPLY TO COOLANT COOLERS

CROSS REFERENCE TO RELATED APPLICATION

This application claims priority from German Patent Application No. 10 2018 211 425.0, filed Jul. 10, 2018, which is incorporated herein by reference in its entirety.

FIELD OF THE INVENTION

The invention relates to a cooling system for a motor vehicle as well as to a motor vehicle with such a cooling system.

BACKGROUND OF THE INVENTION

As a rule, a motor vehicle has a cooling system in which a liquid coolant is conveyed by means of one or more coolant pumps in at least one cooling circuit, thereby absorbing thermal energy from components that are integrated into the cooling circuit, for instance, from the internal combustion engine of a combustion machine of the motor vehicle. Once the combustion machine has reached an operating temperature range, this thermal energy is then transferred to the ambient air in at least one coolant cooler as well as, optionally at times, in a heating heat exchanger, and in the case of a heating heat exchanger, the thermal energy is transferred to the ambient air that is intended for climate control of the interior of the motor vehicle.

Combustion machines that are designed to power motor vehicles are normally turbocharged in order to raise the specific output and to lower the specific fuel consumption. A widespread approach consists of turbocharging combustion machines by means of one or more exhaust gas turbochargers. The latter encompass a turbine with a rotor through which exhaust gas flows that has been discharged by the internal combustion engine of the combustion machine, as a result of which the rotor is driven so as to rotate. By means of a shaft, the turbine rotor drives the rotor of a compressor that is integrated into a fresh gas line of the internal combustion engine, thus compressing the fresh gas. As an alternative, such a compressor can also be powered by means of a different drive, for example, by the internal combustion engine itself or by an electric drive motor. Among other things, the compression can increase the amount of fresh gas supplied to the combustion chambers of the internal combustion engine and thus the amount of fuel that can be converted in the combustion chamber during one work cycle. At the same time, however, the compression raises the temperature and thus increases the specific volume of the compressed fresh gas, which counteracts the increase in the filling of the combustion chambers that the compression is supposed to achieve. In order to prevent this, an intercooler is usually integrated into the fresh gas line downstream from the compressor, said intercooler bringing about an at least partial re-cooling of the fresh gas (charge air) that had been warmed up by the compression. Such an intercooler can also be integrated into the cooling system of the motor vehicle, so that its cooling effect is based on a heat transfer from the fresh gas to the coolant of the cooling system that is flowing through the intercooler (see U.S. Pat. No. 7,464,700 B2 or U.S. Pat. No. 7,290,593 B2).

In a known procedure, the motor vehicle components that are to be cooled by means of a cooling system are integrated into various cooling circuit arrangements that each encompass a coolant cooler. In this context, these cooling circuit arrangements can differ, particularly also in terms of the prescribed temperature of the coolant during operation. For instance, the operating temperature of the coolant in a (high-temperature) cooling circuit arrangement comprising cooling conduits of an internal combustion engine can be designed so as to be considerably higher than the operating temperature of the coolant in a (low-temperature) cooling circuit arrangement comprising an intercooler.

The coolant cooler or coolers of the cooling system of a motor vehicle is/are normally arranged in the engine compartment of the motor vehicle behind a radiator grille, which is part of the body of a motor vehicle. Ambient air, which has entered the engine compartment via the radiator grille, flows through the coolant cooler or coolers, resulting in a re-cooling of the coolant in the coolant cooler or coolers. This cooling air subsequently flows through other sections of the engine compartment and is once again conveyed out of the engine compartment in one or more places. The flow through the coolant cooler or coolers and through the engine compartment leads to a relatively high flow resistance and thus to relatively poor aerodynamics of the motor vehicle, which has a detrimental impact on the consumption of the energy (especially on the fuel consumption) that is needed to operate the motor vehicle.

Since the coolant cooler or coolers of the cooling system of a motor vehicle regularly only needs/need to be cooled at certain times and then to differing extents and since this need has to be met by the ambient air that is conveyed through the radiator grille to the coolant cooler or coolers, such a motor vehicle can have a cover device that is often referred to as a cooler louver by means of which the openings in the radiator grille can be covered as needed. In the closed state, such a cover device then essentially prevents ambient air from flowing through the radiator grille into the engine compartment, thus avoiding the flow resistance associated with the flow through the coolant cooler or coolers and through the engine compartment (see German patent application DE 10 2015 109 229 A1).

When it comes to the cooling system of a motor vehicle having two coolant coolers, the two coolant coolers can differ in terms of the timing as well as the extent of the cooling demand that has to be met by the ambient air that is conveyed through the radiator grille to the coolant cooler or coolers. With such a motor vehicle, two cover devices can be provided which can be adjusted independently of each other and which are associated with the respective sections of the radiator grille behind which the individual coolant coolers are arranged. This, however, entails relatively high engineering resources and thus costs.

U.S. Pat. Appln. No. 2013/0149119 A1 describes two coolant coolers for the cooling system of a motor vehicle which have been combined into one unit.

International patent application WO 2009/087106 A1 discloses a heat exchanger which can be used as the coolant cooler for the cooling system of a motor vehicle and into which an electric heating module has been integrated in order to heat up an air stream.

SUMMARY OF THE INVENTION

The invention was based on the objective of achieving a variable adjustment of the cover devices for influencing the cooling air supply to the coolant coolers in the simplest possible manner in a cooling system of a motor vehicle having at least two coolant coolers, each of which is associated with a cover device.

This objective is achieved by means of a cooling system according to the claims. A motor vehicle with such a cooling system is the subject matter of the claims. Advantageous embodiments of the cooling system according to the invention and thus of the motor vehicle according to the invention are the subject matters of the additional patent claims and/or they ensue from the description of the invention below.

A cooling system according to the invention for a motor vehicle has a first cooling circuit arrangement with a first coolant cooler and a second coolant circuit arrangement with a second coolant cooler. A cooling air supply to the first coolant cooler can be varied by means of a first cover device and a cooling air supply to the second coolant cooler can be varied by means of a second cover device. In this context, it is provided that the first cover device and the second cover device can be moved by means of an interposed gear of a shared drive such as, for instance, an electric motor or an electric, hydraulic or pneumatic linear actuator. In this context, the gear is configured in such a way that, when the drive is being operated for opening purposes, that is to say, when the drive is actuated in such a way that it moves the cover devices out of a closed position in the direction of an open position, the second cover device is moved (preferably rotated) earlier and/or faster than the first cover device out of the appertaining closed position—in which said cover devices block the cooling air supply to the associated coolant cooler to a relatively large extent and especially to the greatest extent possible—and into the appertaining open position—in which said cover devices block the cooling air supply to the associated coolant cooler to a relatively small extent and especially to the smallest extent possible.

Thus, the cover devices are coupled to each other according to the invention via the gear in such a way that, owing to the effect of a drive that is jointly provided for both cover devices, the second cover device can already be opened, at least somewhat, while the first cover device still remains in the closed position, or else the second cover device is opened faster and thus to a greater extent than the first cover device, at least during a first period of time while the drive is effectuating the opening procedure. Since the cooling system according to the invention is preferably also configured in such a way that the (optionally stepless) drive can be used to select a number of intermediate positions that fall between a first drive position, in which the cover devices are in the closed position, and a second drive position, in which the cover devices are in the open position, the configuration according to the invention of a cooling system makes it possible to meet an already existent cooling demand of the second coolant cooler by supplying cooling air, whereas such a cooling demand does not yet exist for the first coolant cooler, so that the latter can still remain covered—in terms of a flow of cooling air—by means of the associated (first) cover device. This can have a positive effect on the flow resistance for the cooling air and thus on the aerodynamics of a motor vehicle according to the invention.

Such a motor vehicle comprises at least one cooling system according to the invention. In this context, it can preferably be provided that the coolant coolers are arranged behind an optionally multi-part radiator grille of the motor vehicle and that openings of the radiator grille can be closed by means of the cover devices of the cooling system. Here, the cover devices can be arranged on the side of the radiator grille facing away from the coolant coolers or else between the radiator grille and the coolant coolers. The cover devices can also be integrated into the radiator grille or can form the radiator grille themselves in that each one of them comprises, for example, a plurality of louver lamellae that can be moved together by means of the drive.

A cooling system according to the invention can preferably be configured in such a way that, when the drive is being operated for closing purposes—that is to say, when the drive is actuated in such a way that it moves each of the cover devices all the way to the closed position—the second cover device reaches the appertaining closed position at a later point in time than the first cover device does. This makes it possible for the first cover device to already be closed in order to once again attain advantageous aerodynamics for a motor vehicle according to the invention, while the cooling demand of the coolant cooler can still be met in that cooling air is being supplied, thanks to the fact that the second cover device is still at least partially open.

The cooling circuit arrangements of a cooling system according to the invention can be configured separately from each other, which can result in different points in time for the beginning of the cooling demand for re-cooling the (preferably liquid) coolant that is being conveyed in said arrangement. In this context, the term "separate" configuration of the cooling circuit arrangements is to be understood to mean that they do not comprise an integral section, that is to say, there are no sections that are part of the first cooling circuit arrangement as well as part of the second cooling circuit arrangement. Consequently, there is essentially no exchange of coolant between the two cooling circuit arrangements. The separated cooling circuit arrangements, however, can be indirectly connected to a shared expansion tank, particularly via at least one expansion line, as well as via at least one venting line. In this context, the term "expansion tank" refers to a reservoir for the coolant of the cooling system, said reservoir serving particularly to compensate for temperature-related expansions of the coolant due to a change in the filling level of the coolant in the expansion tank. For this purpose, such an expansion tank can be filled, especially partially, with the coolant and partially with a gas, especially air. An associated venting line can preferably open up into a section of the expansion tank where the gas is present, whereas an associated expansion line opens up into a section containing the coolant, in order to allow coolant to overflow between the partial cooling systems and the expansion tank with the primary goal of compensating for a temperature-related expansion of the coolant, optionally also for filling the cooling systems with coolant, either for the first time or else within the scope of maintenance work.

The separation of the cooling circuit arrangements especially allows different operating temperature ranges to be provided for the coolant in the different cooling circuit arrangements. In this context, the term "operating temperature" of the coolant refers to a temperature that is reached after a heating phase, optionally following the start-up of the cooling system, and that is provided for purposes of achieving a malfunction-free, continuous operation of the cooling system. In particular, the first cooling circuit arrangement can be configured as a high-temperature cooling circuit arrangement and the second cooling circuit arrangement can be configured as a low-temperature cooling circuit arrangement in that the operating temperature range provided for the coolant flowing in the high-temperature cooling circuit arrangement is configured so as to be higher than the operating temperature range provided for the coolant flowing in the low-temperature cooling circuit arrangement.

Preferably, the first cooling circuit arrangement comprises an internal combustion engine or cooling conduits in such an internal combustion engine, especially in a cylinder head and/or in a cylinder housing of such an internal combustion engine. In a likewise preferred manner, the second cooling circuit arrangement can comprise an intercooler that serves to cool the compressed fresh gas (charge air) that is to be supplied to the internal combustion engine, said gas being subsequently burned together with fuel in one or more combustion chambers of the internal combustion engine in order for drive power to be generated by the internal combustion engine. Towards this end, a combustion machine can comprise, in addition to among other things the internal combustion engine, also a fresh gas line via which fresh gas can be supplied to the internal combustion engine, whereby a compressor that serves to compress the fresh gas as well as an intercooler situated between the compressor and the internal combustion engine are integrated into the fresh gas line. In this context, the compressor can especially be part of an exhaust gas turbocharger that also comprises an exhaust gas turbine that is integrated into an exhaust gas line of the combustion machine. Exhaust gas that had been generated during the combustion of fresh gas-fuel mixtures in the combustion chamber(s) of the internal combustion engine can be discharged via the exhaust gas line. A turbine rotor that is driven so as to rotate by such an exhaust gas stream is connected to a compressor rotor for purposes of delivering the compression output.

When it comes to an internal combustion engine on the one hand and to an intercooler on the other hand, it can be advantageous to carry out the cooling with different quantities of coolant which exhibit different operating temperature ranges, and this is conducive to integration into different cooling circuit arrangements of a cooling system according to the invention. At the same time, an intercooler can make it necessary to demand cooling for the coolant that is flowing through said intercooler at an earlier point in time than an internal combustion engine does, and this demand has to be met by supplying cooling air to the appertaining coolant cooler. Accordingly, the preferably provided integration of the intercooler into the second cooling circuit arrangement is advantageous since its coolant cooler is activated earlier and/or faster to a relatively large extent by the associated (second) cover device.

Thanks to the configuration of a cooling system according to the invention, which is characterized in that the cover devices are completely closed in a first drive position and are completely open in a second drive position, it can be ensured that—in spite of the time-offset start and/or of the different speeds of the opening movements of the cover devices when the drive is being operated for opening purposes—the greatest possible blocking of the cooling air supplied to both coolant coolers can be achieved in the closed positions, and the smallest possible blocking of the cooling air supply can be achieved in the open positions. In order to attain this, it can be fundamentally provided that the path along which or the angle at which the first cover device has to be moved in order to be adjusted between the closed position and the open position is smaller than the corresponding path along which or the angle at which the second cover device has to be moved. Preferably, however, it is provided that these paths or angles are the same or that the cover devices can each be moved between the closed position and the open position over the same (path or angle) distance, which can be achieved by a suitable configuration of the gear.

For example, with a cooling system according to the invention, in which the gear is configured in such a way that, when the drive is being operated for opening purposes, the second cover device is moved out of a closed position in the direction of an open position at an earlier point in time than the first cover device is, the speed of the opening movement of the second cover device can be configured to be lower than the speed of the opening movement of the first cover device that starts later, so that the completely open positions of both cover devices are reached at the same time in the appertaining (second) drive position.

In addition or as an alternative, it can be provided for the gear to be configured in such a way that, when the drive is being operated for opening purposes, the second cover device reaches the appertaining open position at an earlier point in time than the first cover device does. Accordingly, after the second cover device has already reached its open position, the first cover device can still continue to be moved further by means of the drive until it, too, has reached its open position in the second drive position. Such a temporary uncoupling of the movements of the cover devices at the end of the opening operation of the drive can be realized, for example, by integrating a slip clutch which slips once the second cover device has reached the open position while the opening operation of the drive is still active.

The gear of a cooling system according to the invention can preferably comprise one or more coupling rods and/or coupling cables, as a result of which the gear of a cooling system according to the invention can be designed in a very simple manner from an engineering standpoint. A movement of the second cover device that starts at an earlier point in time when the drive is being operated for opening purposes can then be advantageously achieved if at least two coupling rods are provided that are rotatably connected to each other, whereby the longitudinal axes of the coupling rods are not oriented in parallel when the cover devices are in the closed positions. At the beginning of the opening operation, such coupling rods, which are rotatably connected to each other and which are not oriented in parallel, are first placed into a parallel orientation, during which time a movement of the second cover device is not yet being transmitted to the first cover device via these coupling rods. Only after such a parallel and especially coaxial orientation of the coupling rods has been established can they function as pulling or pushing means in order to then transmit a movement of the second cover device to the first cover device.

In addition or as an alternative to this, the coupling rods or at least one of the coupling rods can be configured so as to be telescopic, so that, at the beginning of the opening operation, the telescopic coupling rod is at first lengthened or shortened before a movement of the second cover device is transmitted to the first cover device.

Once again, in addition or as an alternative, a coupling cable of the gear of a cooling system according to the invention can run between two joining sites (sites where the cable is connected to additional components of the gear) without being tensioned in the closed positions of the cover devices. Here, the coupling cable can be configured to be stiff, so that it does not lengthen to any relevant extent (elastically or non-elastically) while it is functioning as the gear. In this case, the coupling cable can be laid in the form of one or more arcs, as long as the cover devices are not yet in the closed positions. A movement of the second cover device then initially causes tensioning of the coupling cable before it transmits the movement of the second cover device to the first cover device. As an alternative, the coupling cable can be configured so that it can be lengthened elastically or non-elastically (for example, in that it is appropriately braided), so that a movement of the second cover device initially causes a lengthening of the coupling cable before it then transmits the movement of the second cover device to the first device when the coupling cable is in the tensioned state.

In a gear of a cooling system according to the invention having coupling rod(s) and/or pulling cable(s), different movement speeds of the cover devices can be implemented by employing simple and thus advantageous design measures if these are each associated with a pivot bearing of the cover devices via different levers.

According to another preferred embodiment of a cooling system according to the invention, it can be provided for the first cover device and/or the second cover device to be pressed by means of a spring element in the direction of the (respective) associated closed position. This allows the use of a gear that is very simple in terms of its design.

The gear of a cooling system according to the invention can also advantageously be configured as a toothed wheel system or can encompass such a toothed wheel system. Different points in time at which an opening operation by the drive causes the cover devices to be moved, starting from the closed positions, can then be implemented, for example, in that only via a section of the circumference of a toothed wheel that is associated with the first cover device does a toothed wheel of the drive become engaged with the former toothed wheel. As an alternative, a coupling—which is only engaged after a defined rotation of a toothed wheel that is associated with the drive—can then transmit a rotational movement of this toothed wheel to a toothed wheel that is associated with the first cover device. Different movement speeds of the cover devices can be realized with such a toothed wheel system relatively easily on the basis of appropriate transmission ratios of the pairs of toothed wheels.

The covering of the coolant coolers by means of the cover devices—which is put forward according to the invention in some variants—can especially be advantageously implemented when the coolant coolers are arranged next to each other and, in particular, above each other in an orientation of the cooling system envisaged for the operation.

The motor vehicle according to the invention can especially be a wheel-mounted and not rail-borne motor vehicle (preferably a passenger car or a truck).

The indefinite articles ("a", "an"), especially in the patent claims and in the description that generally explains the patent claims, are to be understood as such and not as numbers. Therefore, components described in a concrete manner should be construed in such a way that they are present at least once and can also be present several times.

BRIEF DESCRIPTION OF THE DRAWINGS

The present invention will be explained in greater detail below on the basis of the embodiments depicted in the drawings. The drawings show the following, each in a simplified depiction.

DETAILED DESCRIPTION OF THE INVENTION

Figure 1:
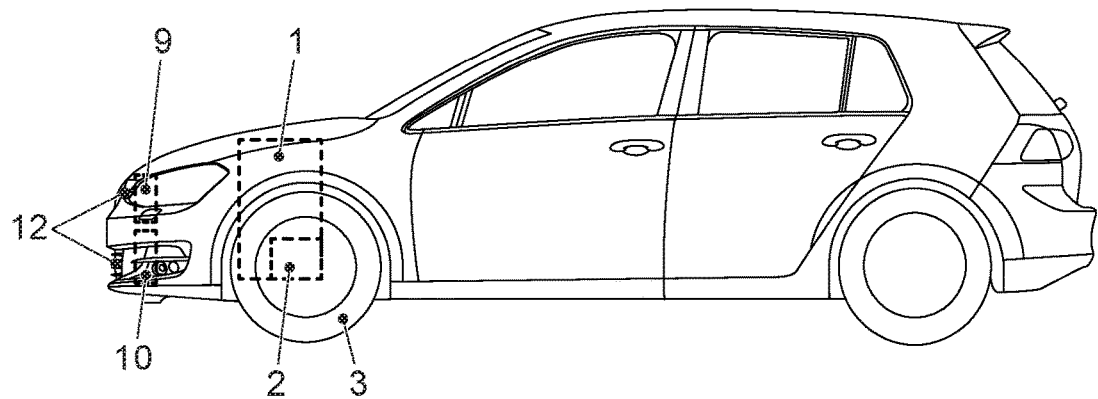
FIG. 1: a motor vehicle according to the invention.
Figure 2:
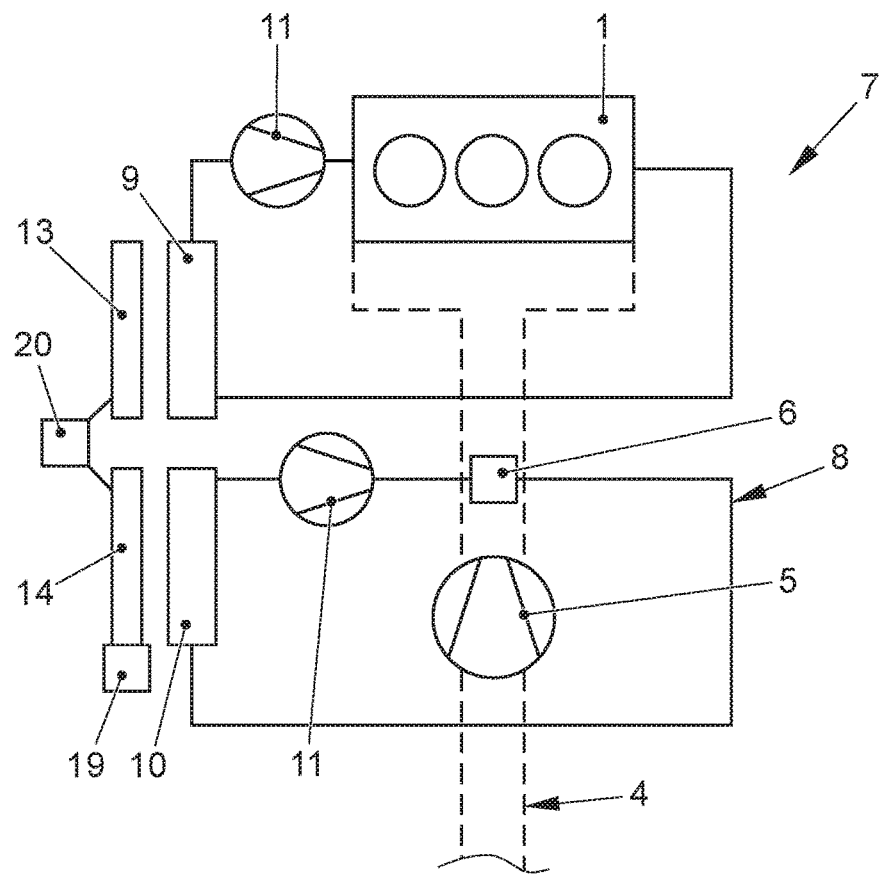
FIG. 2: a cooling system according to the invention.

FIG. 1 shows a motor vehicle according to the invention. This vehicle comprises an internal combustion engine 1 that is installed in an engine compartment and that is part of a combustion machine. During operation, the internal combustion engine 1 generates drive power that can be transmitted via an automatic or manual transmission 2 to the driven wheels 3 of the motor vehicle. As shown in FIG. 2, in a fresh gas line 4 of the combustion machine, there is a compressor 5 that serves to compress fresh gas that is to be supplied to the internal combustion engine 1, and there is an intercooler 6 that is integrated at a position between the compressor 5 and the internal combustion engine 1. In order to use the intercooler 6 to cool, among other things, the internal combustion engine 1 as well as the charge air, that is to say, the fresh gas that has already been compressed, the motor vehicle also has a cooling system that, as shown in FIG. 2, comprises at least two cooling circuit arrangements 7, 8 which are separate from each other and into each of which a coolant cooler 9, 10—which serves to re-cool the coolant that is being conveyed in the associated cooling circuit arrangement 7, 8 by means of a coolant pump 11—is integrated. FIG. 2 shows the cooling circuit arrangements 7, 8 in a greatly simplified manner, each simply comprising a cooling circuit and the cited components. Fundamentally, the cooling circuit arrangements 7, 8 of the cooling system of a motor vehicle can each have a plurality of cooling circuits, some of which make a transition into each other, and into which a plurality of additional components that are to be cooled can also be integrated.

The coolant coolers 9, 10 are arranged above each other or combined into a unit in an appropriate arrangement and they are arranged directly behind or next to a multi-part radiator grille 12 that is integrated into the front of the motor vehicle. In each case, a part of the radiator grille 12 and one of the coolant coolers 9, 10 is associated with a cover device 13, 14 which can be installed, for example, between the radiator grille 12 and the coolant coolers 9, 10. The cover devices 13, 14 can each comprise, for instance, a plurality of louver lamellae that can be moved individually and especially that are mounted so as to rotate and that can both be moved jointly by means of a drive. In this process, they can be moved between a closed position in which they close the openings in the appertaining part of the radiator grille 12 to the greatest extent possible, thus covering the associated coolant coolers 9, 10, and an open position in which they open the openings in the radiator grille 12, and thus also the associated coolant coolers 9, 10, to the greatest extent possible.

In FIGS. 3A to 5, the cover devices 13, 14 are depicted in a simplified form of an individual louver lamella. Accordingly, this louver lamella or each appertaining louver lamella encompasses a cover element 15 which, depending on its orientation, covers one or more openings of the radiator grille 12 and thus at least a section of the associated coolant cooler 9, 10, as well as a side part 16 that extends from one side of the cover element 15 and that serves to mount the associated element 15 so as to rotate. For this purpose, each of the side parts 16 forms a pivot bearing element 17 that cooperates with a complementary pivot bearing element of a support structure (not shown here) of the motor vehicle. Rotating the cover elements 15 around a rotational axis 18 defined by the pivot bearing elements allows these elements to be moved from the closed positions of the cover elements 13, 14 shown in FIGS. 3 to 5, in which the cover elements 15 are oriented, for example, vertically inside the engine compartment of the motor vehicle, into an open position, in which they are oriented for instance, horizontally, inside the engine compartment.

A movement of the cover devices 13, 14 is effectuated by means of a drive 19 that comprises, for example, an electric motor (not shown here) that can act on the pivot bearing element 17 of the second cover device 14, either directly or else by means of an interposed reducing gear (not shown here). A movement of the second cover device 14 is then transmitted, at least at times, to the first cover device 13 by means of a gear 20.

Figure 3A:
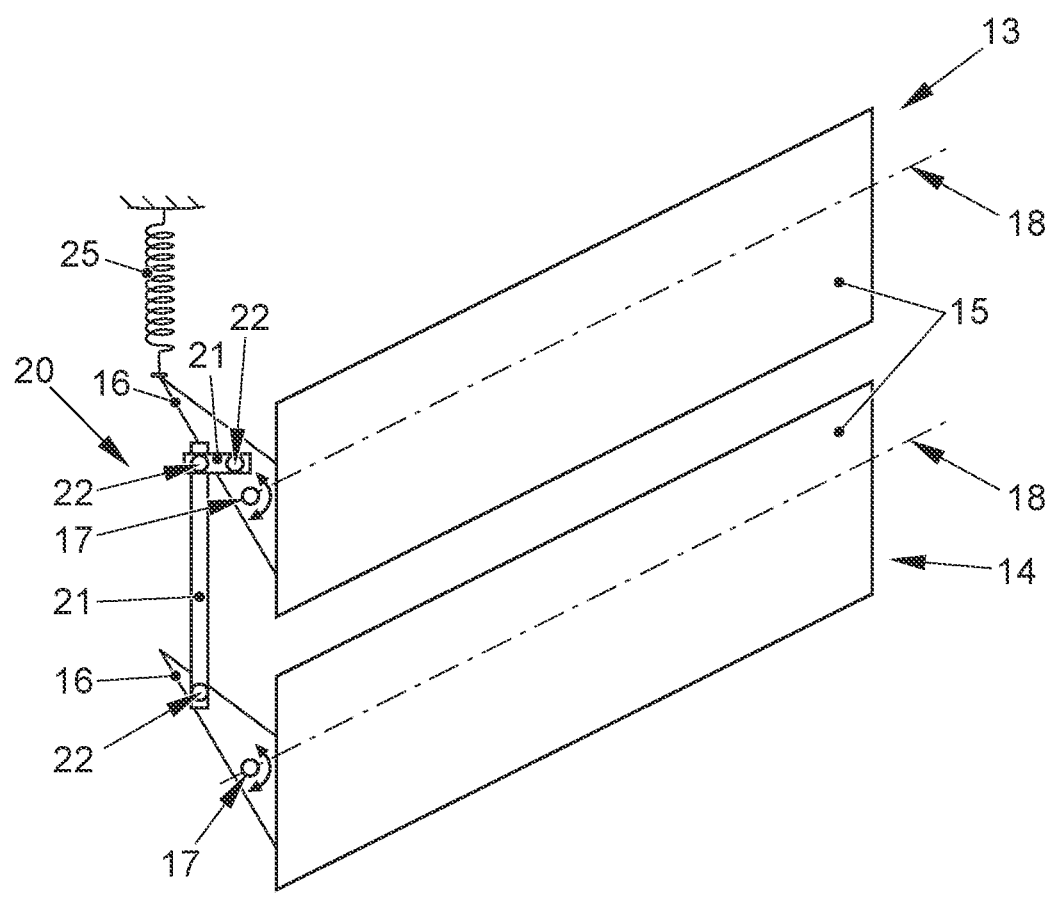
FIGS. 3A-C: two cover elements and a gear that couples said elements, in a first embodiment.

In the embodiment shown in FIG. 3A, the gear 20 comprises two coupling rods 21 which are each joined together in the area of one of their ends so as to be rotatable around an axis that is oriented parallel to the rotational axes 18 of the cover devices 13, 14. The coupling rods 21 are each connected to the side part 16 of one of the cover devices 13, 14 by means of each of their other ends so as to rotate around axes which, in turn, are oriented parallel to the rotational axes of the cover devices. Here, the pivot bearing points 22—which are formed by the cover devices 13, 14 together with each of the coupling rods 21—are arranged at different distances from the rotational axis 18 of each appertaining cover device 13, 14. In concrete terms, in the case of the first cover device 13, this distance is smaller than in the case of the second cover device 14. The coupling rods 21 are thus each associated with a pivot bearing of the cover devices 13, 14 via different levers. In the closed positions of the cover devices 13, 14, as shown in FIG. 3A, the coupling rods 21 or their longitudinal axes are not oriented in parallel, but rather at an angle of, for instance, approximately 90° relative to each other. Consequently, a movement of the second cover device 14 brought about by the drive 19, as a result of which the associated cover element 15 is swiveled upwards, initially causes the coupling rods 21 to rotate around the pivot bearing points 22 which are formed by said rods, until they are brought into an orientation in which they are parallel to each other. Subsequently, the two coupling rods 21 function as pulling rods by means of which a further movement of the second cover device 14 is then transmitted to the first cover device 13. The latter is subsequently likewise swiveled in the direction of its open position. Owing to the shorter distance between the pivot bearing point 22—which is formed by the first cover device 13 together with the associated coupling rod 21—and the rotational axis 18 of the first cover device 13 in comparison to the distance between the pivot bearing point 22—which is formed by the second cover device 14 together with the associated coupling rod 21—and the rotational axis 18 of the second cover device 14, the movement speed or the rotational speed of the first cover device 13 is then greater than that of the second cover device 14. This makes it possible for both cover devices 13, 14 to reach their respective open positions at the same time and at an essentially identical angle of rotation.

Figure 3B:
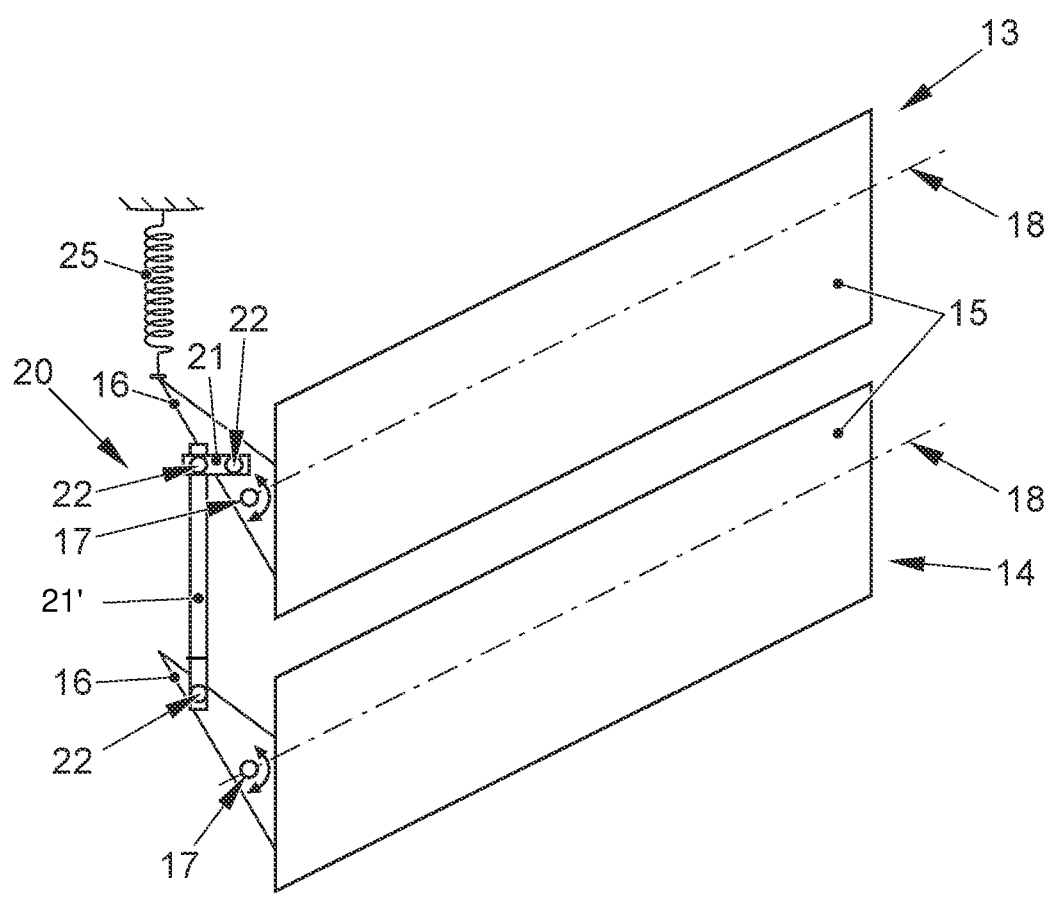
Figure 3C:
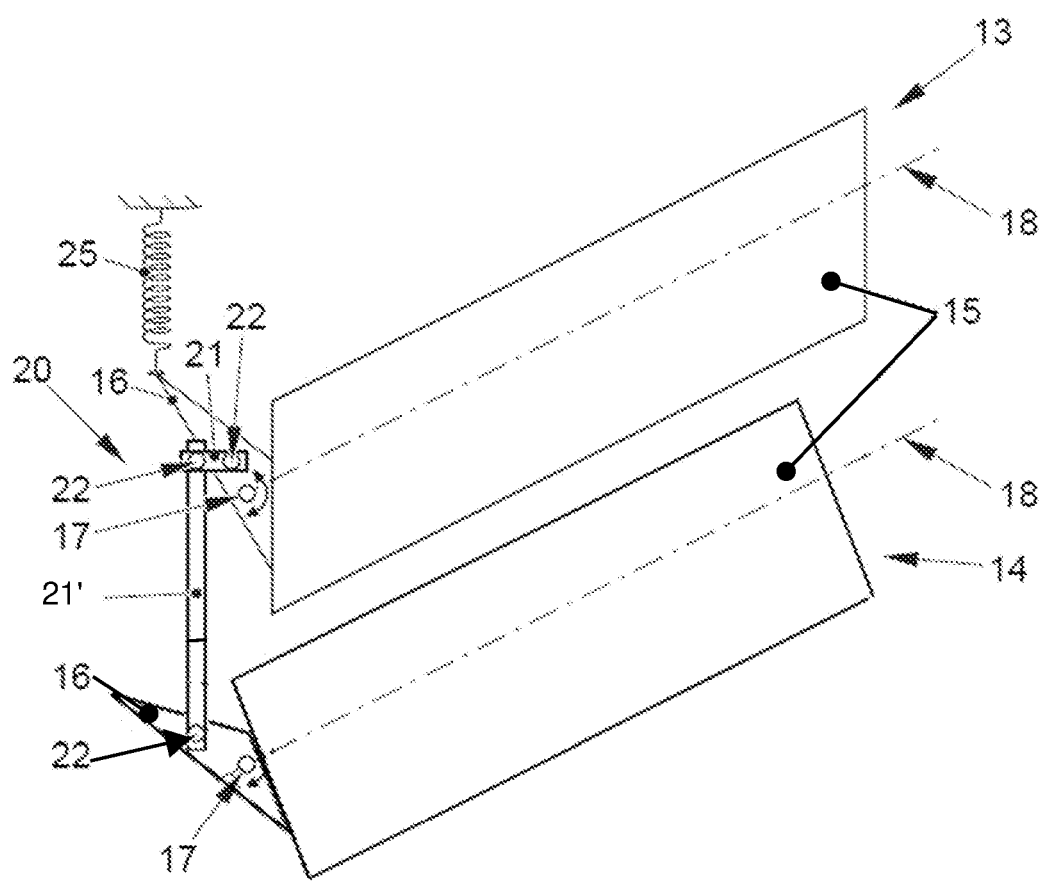

In the embodiment shown in FIGS. 3B and C, the two coupling rods 21 or at least one of the coupling rods 21 of FIG. 3A is/are configured to be telescopic, so that, at the beginning of the opening operation, the at least one telescopic coupling rod 21' is, at first, lengthened before a movement of the second cover device 14 is transmitted to the first cover device 13. Alternatively, the at least one telescopic coupling rod 21' may, at first, be shortened before a movement of the second cover device 14 is transmitted to the first cover device 13.

When the drive is being operated for closing purposes—that is to say, when the second cover device 14 is moved by the drive 19 in the direction of its closed position—the first cover device 13 follows this closing movement of the second cover device 14, once again at a greater speed of movement. The torque around the appertaining rotational axis 18, which is needed for the closing movement of the first cover device 13, can especially be applied as a function of gravity, that is to say, by a corresponding weight distribution of the first cover device 13, and/or by means of a spring element 25 (not shown here).

Figure 4A:
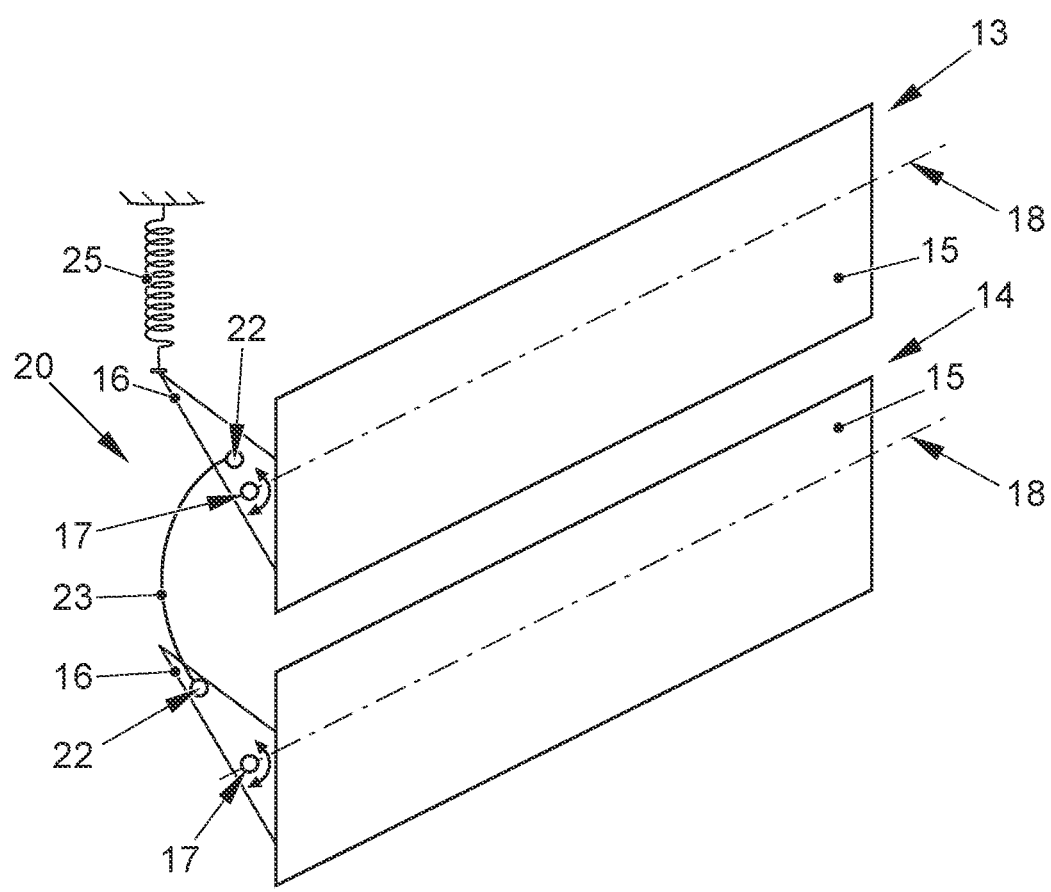
FIGS. 4A and B: two cover elements and a gear that couples said elements, in a second embodiment.
Figure 4B:
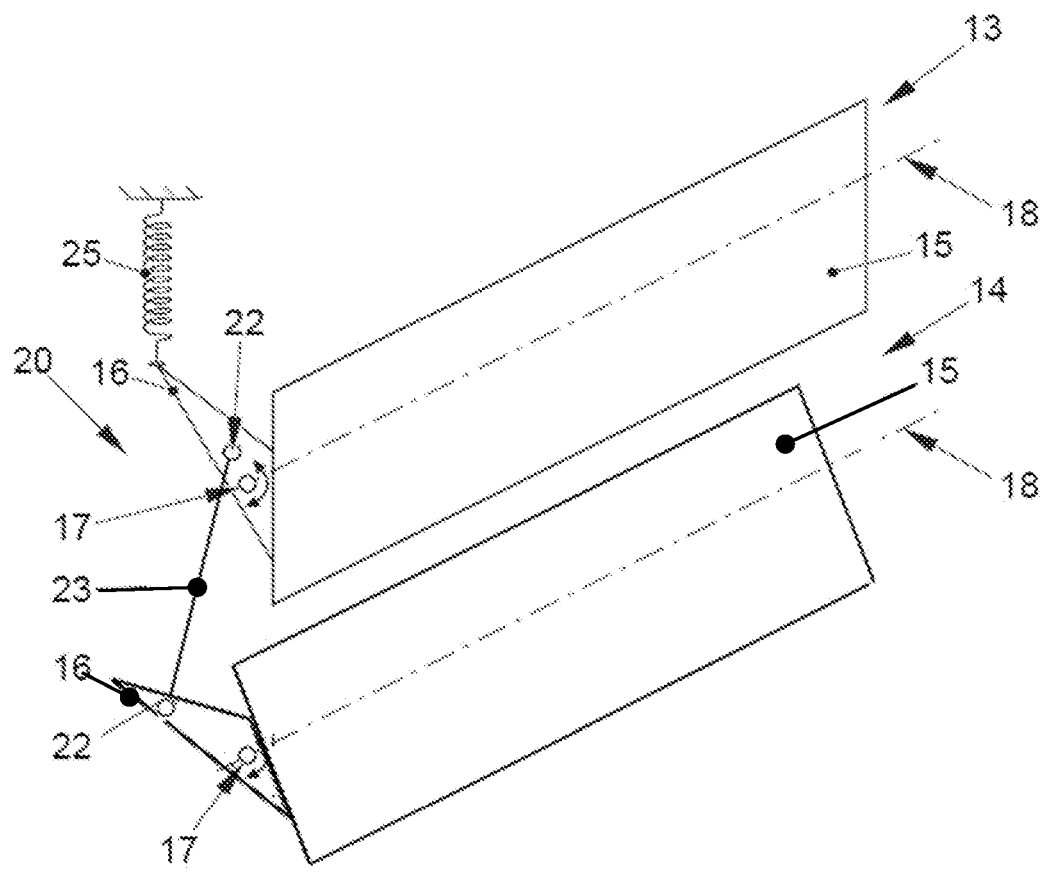

In the embodiment shown in FIGS. 4A and B, instead of comprising two coupling rods 21, the gear 20 comprises a coupling cable 23 that is connected to each side part 16 of the cover devices 13, 14 at the pivot bearing points 22. If the cover devices 13, 14 are in their closed positions, the coupling cable 23 is in its non-tensioned state in which it is laid in the form of an arc (see FIG. 4A). When the second cover device 14 is then moved in the direction of its open position by means of the drive 19, the coupling cable 23 is at first brought into a straight course—analogously to the parallel orientation of the coupling rods 21 in the embodiment according to FIG. 3A—and is thus tensioned (see FIG. 4B) before the coupling cable 23 transmits this movement of the second cover device 14 to the first cover device 13.

Figure 5:
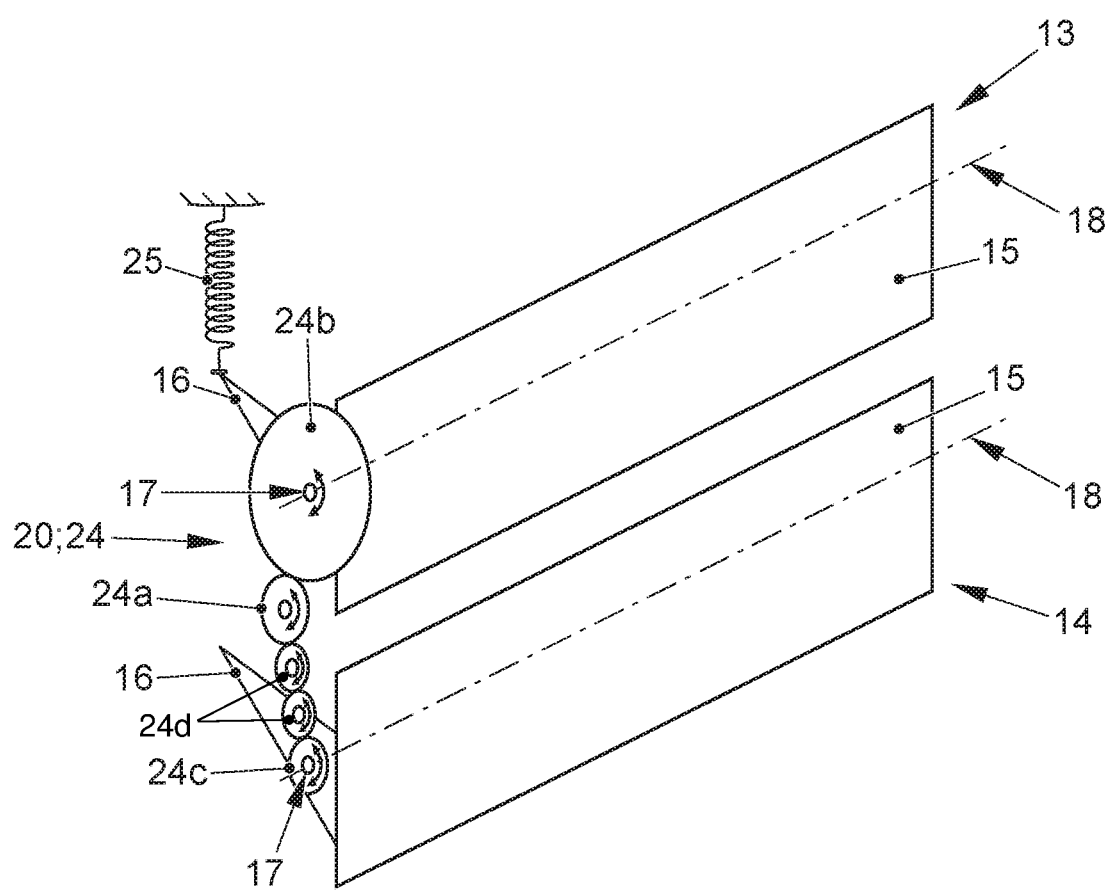
FIG. 5: two cover elements and a gear that couples said elements, in a third embodiment.

In the embodiment shown in FIG. 5, the gear 20 comprises a toothed wheel gear. In this context, a toothed wheel 24a, which is connected to a driven shaft of the drive 19 engages directly with a toothed wheel 24b, which is non-rotatably connected to the pivot bearing element 17 that defines the rotational axis 18 and that is part of the first cover device 13. In contrast, a toothed wheel 24c, which is non-rotatably connected to the pivot bearing element 17 that defines the rotational axis and that is part of the second cover device 14 is connected to the toothed wheel 24a of the drive 19 via two intermediate toothed wheels 24d. Consequently, a rotational movement of the drive 19 is transmitted in a different manner to the toothed wheels 24b, 24c of the cover devices 13, 14, as a result of which a movement of the second cover device 14 is realized that is faster than that of the first cover device 13. In order to achieve that—in spite of this configuration of the gear 20—both cover devices 13, 14 are swiveled between the appertaining closed and open positions by the same angle, thus covering and opening the associated coolant coolers 9, 10 or the openings in the radiator grilles 12 to the same extent, it can be provided for the pivot bearing element 17 of the second cover device 14 to be connected to the corresponding toothed wheel 24c via a slip clutch (not shown here). This slip clutch slips once the second cover device 14 has already been moved by the drive 19 into the open or closed position (for example, it cannot be moved any further because of a stop), and subsequently the first cover device 13, which is still being moved more slowly by means of the drive which continues to be operational, is moved into the corresponding open or closed position.

LIST OF REFERENCE NUMERALS 1 internal combustion engine
2 transmission
3 wheel
4 fresh gas line
5 compressor
6 intercooler
7 first cooling circuit arrangement
8 second cooling circuit arrangement 9 first coolant cooler
10 second coolant cooler
11 coolant pump
12 radiator grille
13 first cover device
14 second cover device
15 cover element of a cover device
16 side part of a cover device
17 pivot bearing element of a cover device
18 rotational axis of a cover device
19 drive
20 gear
21 coupling rod
22 pivot bearing point
23 coupling cable
24 toothed wheel gear
24a toothed wheel of the drive
24b toothed wheel of the first cover device
24c toothed wheel of the second cover device
24d intermediate toothed wheel
25 spring element

The invention claimed is:

1. A cooling system for a motor vehicle, comprising:
   a first cooling circuit arrangement comprising:
      a first coolant cooler, and
      an internal combustion engine or cooling conduits of the internal combustion engine,
   a second coolant circuit arrangement with a second coolant cooler and an intercooler,
   a first cover device by means of which a cooling air supply to the first coolant cooler can be varied, and
   a second cover device by means of which a cooling air supply to the second coolant cooler can be varied,
   wherein the first cover device and the second cover device can be moved by means of an interposed gear of a shared drive, whereby the gear is configured in such a way that, when the drive is being operated for opening purposes, the second cover device is moved earlier than the first cover device out of a closed position in the direction of an open position.

2. The cooling system according to claim 1, wherein the first and second cover devices can each be moved between the closed position and the open position over the same distance.

3. The cooling system according to claim 1, wherein the gear is configured in such a way that, when the drive is being operated for opening purposes, the second cover device is moved out of the closed position in the direction of the open position at an earlier point in time than the first device, whereby the speed of an opening movement of the first cover device is then greater than the speed of an opening movement of the second cover device.

4. The cooling system according to claim 1, wherein the gear is configured in such a way that, when the drive is being operated for opening purposes, the second cover device reaches its open position at an earlier point in time than the first cover device does.

5. The cooling system according to claim 1, wherein the gear comprises one or more coupling rods and/or one or more coupling cables.

6. The cooling system according to claim 5,
   wherein the one or more coupling rods and/or the one or more coupling cables are each associated with a first pivot bearing of the first cover device and a second pivot bearing of the second cover device; and
   wherein a distance between the first pivot bearing and a first rotational axis of the first cover device is different than a distance between the second pivot bearing and a second rotational axis of the second cover device.

7. The cooling system according to claim 5, wherein:
   at least two coupling rods are provided that are rotatably connected to each other, whereby the coupling rods are not oriented in parallel in the closed positions of the cover devices, and/or
   the coupling rods or at least one of the coupling rods can be configured so as to be telescopic, and/or
   the coupling cable runs between two joining sites without being tensioned in the closed positions of the cover devices.

8. The cooling system according to claim 1, wherein the first cover device and/or the second cover device is/are pressed in the direction of their associated closed position(s) by means of a spring element.

9. The cooling system according to claim 1, wherein the gear is configured as a toothed wheel gear or comprises a toothed wheel.

10. A motor vehicle having a cooling system according to claim 1,
    whereby the coolant coolers are arranged behind a radiator grille, and
whereby openings of the radiator grille can be closed by means of the cover devices.

* * * * *